US011623533B1

(12) United States Patent
Palombini et al.

(10) Patent No.: US 11,623,533 B1
(45) Date of Patent: Apr. 11, 2023

(54) SYSTEM FOR AN ELECTRIC AIRCRAFT CHARGING WITH A CABLE REEL

(71) Applicant: BETA AIR, LLC, South Burlington, VT (US)

(72) Inventors: John Charles Palombini, South Burlington, VT (US); Skye Carapetyan, South Burlington, VT (US); Richard Donnelly, South Burlington, VT (US); Jake Pill, South Burlington, VT (US); Ed Hall, South Burlington, VT (US); Cole William Hanson, Burlington, VT (US); James Whitehill, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/736,530

(22) Filed: May 4, 2022

(51) Int. Cl.
*B60L 53/18* (2019.01)
*B60L 53/30* (2019.01)
(Continued)

(52) U.S. Cl.
CPC .............. *B60L 53/18* (2019.02); *B60L 53/30* (2019.02); *B64F 1/007* (2013.01); *H02J 7/0042* (2013.01)

(58) Field of Classification Search
CPC ........ B60L 53/18; B60L 53/30; H02J 7/0042; H02J 2310/44; B64F 1/007
(Continued)

(56) References Cited

U.S. PATENT DOCUMENTS

| 9,487,100 B2 | 11/2016 | Hamrin et al. |
| 9,583,932 B2 | 2/2017 | Zuber |

(Continued)

FOREIGN PATENT DOCUMENTS

| CN | 213973617 | 8/2021 |
| DE | 102016223715 | 5/2018 |

(Continued)

OTHER PUBLICATIONS

N/A, SKYCHARGE | Green Motion, Nov. 15, 2021.
N/A, EvoCharge EvoReel, Nov. 15, 2021.

*Primary Examiner* — Edward Tso
*Assistant Examiner* — Aaron Piggush
(74) *Attorney, Agent, or Firm* — Caldwell Intellectual Property Law

(57) ABSTRACT

Electric aircraft charging system including charging cable configured to carry electricity and energy source, wherein the energy source is electrically connected to the charging cable. The system also including a cable reel module, the cable reel module including a reel, wherein the reel is rotatably mounted to the cable reel module, wherein the reel is configured to rotate in a forward direction and a reverse direction, and the charging cable, in a stowed configuration, is wound around the reel. The cable reel module further including a rotation mechanism configured to rotate the reel in reverse, and a cable reel module door having a closed position and an open position, wherein the closed position prevents access to the reel and the open position allows access to the reel. The system additionally including a controller communicatively connected to the rotation mechanism and configured to send a retraction signal to the rotation mechanism.

20 Claims, 9 Drawing Sheets

(51) Int. Cl.
*B64F 1/00* (2006.01)
*H02J 7/00* (2006.01)

(58) Field of Classification Search
USPC .................................. 320/104, 107, 109
See application file for complete search history.

(56) References Cited

U.S. PATENT DOCUMENTS

| | | |
|---|---|---|
| 9,908,422 B2 | 3/2018 | Bianco et al. |
| 9,975,443 B2 | 5/2018 | Jefferies |
| 11,117,680 B2 | 9/2021 | Walsh et al. |
| 11,355,021 B1* | 6/2022 | Miao .................... G08G 5/0069 |
| 2010/0013433 A1* | 1/2010 | Baxter ............... G06Q 20/3278 320/109 |
| 2012/0326664 A1 | 12/2012 | Venegas, Jr. |
| 2014/0111158 A1* | 4/2014 | Kinomura .......... B65H 75/4486 320/109 |
| 2016/0121747 A1* | 5/2016 | Jefferies ............... H02G 3/0493 320/109 |
| 2017/0129351 A1* | 5/2017 | Bianco .................... B60L 53/16 |
| 2017/0297446 A1 | 10/2017 | Namba et al. |
| 2021/0284357 A1 | 9/2021 | Villa et al. |

FOREIGN PATENT DOCUMENTS

| | | |
|---|---|---|
| WO | 2016156567 | 10/2016 |
| WO | 2017222557 | 12/2017 |

\* cited by examiner

SYSTEM FOR AN ELECTRIC AIRCRAFT CHARGING WITH A CABLE REEL

FIELD OF THE INVENTION

The present invention generally relates to the field of charging systems. In particular, the present invention is directed to methods and systems for an electric aircraft charging system.

BACKGROUND

When charging an electric aircraft, easy to use charging systems are important. Messy cable solution may cause frustration and lost time, decreasing the appeal of electric aircraft. Furthermore, having to manually pay in or out the charging cable from a charging system waste time and creates additional hassle. Existing solutions are not satisfactory.

SUMMARY OF THE DISCLOSURE

In an aspect, an electric aircraft charging system, the system including a charging cable, the charging cable configured to carry electricity. The system further including an energy source, wherein the energy source is electrically connected to the charging cable. The system also including a cable reel module, the cable reel module including a reel, wherein the reel is rotatably mounted to the cable reel module, wherein the reel is configured to rotate in a forward direction and a reverse direction, and the charging cable, in a stowed configuration, is wound around the reel. The cable reel module further including a rotation mechanism, the rotation mechanism configured to rotate the reel in the reverse direction and a cable reel module door having a closed position and an open position, wherein the closed position prevents access to the reel and the open position allows access to the reel. The system additionally including a controller communicatively connected to the rotation mechanism, the controller configured to send a retraction signal to the rotation mechanism, wherein the retraction signal causes the rotation mechanism to rotate the reel in a reverse direction.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems for charging an electric aircraft. Aspect of the present disclosure include a reel around which a charging cable can be wrapped. The charging cable can be unwound from the reel by rotating the reel in one direction and wound around the reel by rotating the reel in a second direction. The reel may be rotated by a rotation mechanism.

Aspects of the present disclosure include a locking mechanism designed to prevent the reel from being able to rotate. Locking mechanism may prevent reel from being able to rotate in one or both directions. Aspects of the present disclosure allow for a cable reel module door. In some cases, cable reel module door may be opened and closed using an opening mechanism.

Aspects of the present disclosure allow for a controller to control rotation mechanism, locking mechanism, and/or opening mechanism. In some embodiments, controller may control these components in response to various toggles that may be operated by the user. This allows for convenient operation of the electric aircraft charging system.

Figure 1:
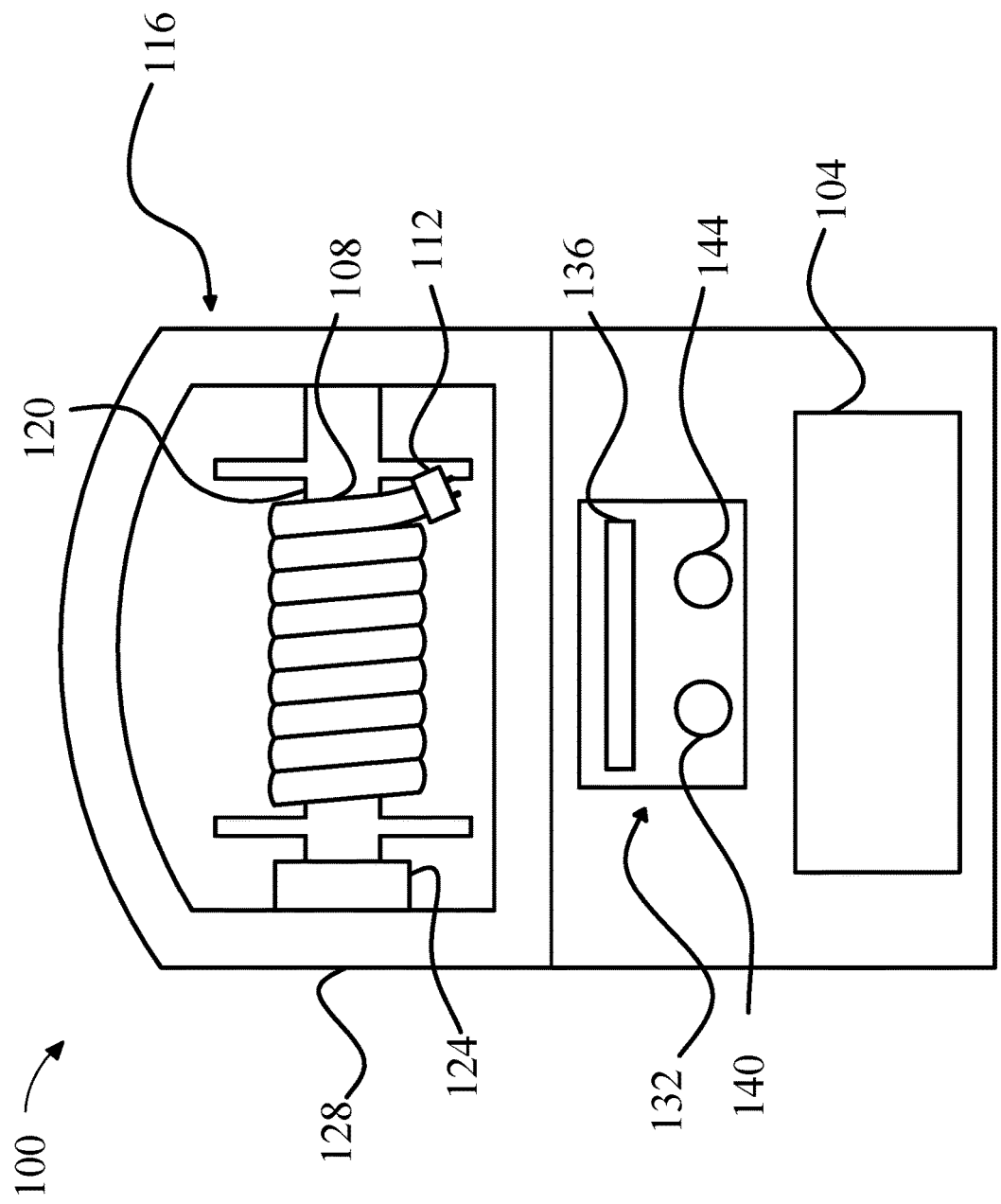
FIG. 1 is a diagram of an exemplary electric aircraft charging system.

Referring now to FIG. 1, an embodiment of an electric aircraft charging system 100 is shown. System 100 includes an energy source 104. An "energy source," for the purposes of this disclosure, is a source of electrical power. In some embodiments, energy source 104 may be an energy storage device, such as, for example, a battery or a plurality of batteries. A battery may include, without limitation, a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Additionally, energy source 104 need not be made up of only a single electrochemical cell, it can consist of several electrochemical cells wired in series or in parallel. In other embodiments, energy source 104 may be a connection to the power grid. For example, in some non-limiting embodiments, energy source 104 may include a connection to a grid power component. Grid power component may be connected to an external electrical power grid. In some other embodiments, the external power grid may be used to charge batteries, for example, when energy source 104 includes batteries. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. Some components of system 100 may be consistent with the charger disclosed in U.S. application Ser. No. 17/477,987 filed on Sep. 17, 2021, titled "Systems and Methods for Adaptive Electric aircraft," the entirety of which is hereby incorporated by reference. Additionally, some components of system 100 may be consistent with the charger disclosed in U.S. application Ser. No. 17/515,448 filed on Oct. 31, 2021, titled "Systems and Methods for an Immediate Shutdown of an Electric aircraft Charger," the entirety of which is hereby incorporated by reference.

With continued reference to FIG. 1, system 100 may include a charging cable 108. A "charging cable," for the purposes of this disclosure is a conductor or conductors adapted to carry power for the purpose of charging an electronic device. Charging cable 108 is configured to carry electricity. Charging cable 108 is electrically connected to the energy source 104. "Electrically connected," for the purposes of this disclosure, means a connection such that electricity can be transferred over the connection. In some embodiments, charging cable 108 may carry AC and/or DC power to a charging connector 112. The charging cable may include a coating, wherein the coating surrounds the conductor or conductors of charging cable 108. One of ordinary skill in the art, after having reviewed the entirety of this disclosure, would appreciate that a variety of coatings are suitable for use in charging cable 108. As a non-limiting example, the coating of charging cable 108 may comprise rubber. As another non-limiting example, the coating of charging cable 108 may comprise nylon. Charging cable 108 may be a variety of lengths depending on the length required by the specific implementation. As a non-limiting example, charging cable 108 may be 10 feet. As another non-limiting example, charging cable 108 may be 25 feet. As yet another non-limiting example, charging cable 108 may be 50 feet.

With continued reference to FIG. 1, system 100 may include a charging connector 112. Charging cable 108 may be electrically connected to charging connector 112. Charging connector 112 may be disposed at one end of charging cable 108. Charging connector 112 may be configured to couple with a corresponding charging port on an electric aircraft. For the purposes of this disclosure, a "charging connector" is a device adapted to electrically connect a device to be charged with an energy source. For the purposes of this disclosure, a "charging port" is a section on a device to be charged, arranged to receive a charging connector.

With continued reference to FIG. 1, charging connector 112 may include a variety of pins adapted to mate with a charging port disposed on an electric aircraft. An "electric aircraft," for the purposes of this disclosure, refers to a machine that is able to fly by gaining support from the air generates substantially all of its trust from electricity. As a non-limiting example, electric aircraft maybe capable of vertical takeoff and landing (VTOL) or conventional takeoff and landing (CTOL). As another non-limiting example, the electric aircraft may be capable of both VTOL and CTOL. As a non-limiting example, electric aircraft may be capable of edgewise flight. As a non-limiting example, electric aircraft may be able to hover. Electric aircraft may include a variety of electric propulsion devices; including, as non-limiting examples, pushers, pullers, lift devices, and the like. The variety of pins included on charging connector 112 may include, as non-limiting examples, a set of pins chosen from an alternating current (AC) pin, a direct current (DC) pin, a ground pin, a communication pin, a sensor pin, a proximity pin, and the like. In some embodiments, charging connector 112 may include more than one of one of the types of pins mentioned above.

With continued reference to FIG. 1, for the purposes of this disclosure, a "pin" may be any type of electrical connector. An electrical connector is a device used to join electrical conductors to create a circuit. As a non-limiting example, in some embodiments, any pin of charging connector 112 may be the male component of a pin and socket connector. In other embodiments, any pin of charging connector 112 may be the female component of a pin and socket connector. As a further example of an embodiment, a pin may have a keying component. A keying component is a part of an electrical connector that prevents the electrical connector components from mating in an incorrect orientation. As a non-limiting example, this can be accomplished by making the male and female components of an electrical connector asymmetrical. Additionally, in some embodiments, a pin, or multiple pins, of charging connector 112 may include a locking mechanism. For instance, as a non-limiting example, any pin of charging connector 112 may include a locking mechanism to lock the pins in place. The pin or pins of charging connector 112 may each be any type of the various types of electrical connectors disclosed above, or they could all be the same type of electrical connector. One of ordinary skill in the art, after reviewing the entirety of this disclosure, would understand that a wide variety of electrical connectors may be suitable for this application.

With continued reference to FIG. 1, in some embodiments, charging connector 112 may include a DC pin. DC pin supplies DC power. "DC power," for the purposes of this disclosure refers, to a one-directional flow of charge. For example, in some embodiments, DC pin may supply power with a constant current and voltage. As another example, in other embodiments, DC pin may supply power with varying current and voltage, or varying currant constant voltage, or constant currant varying voltage. In another embodiment, when charging connector is charging certain types of batteries, DC pin may support a varied charge pattern. This involves varying the voltage or currant supplied during the charging process in order to reduce or minimize battery degradation. Examples of DC power flow include half-wave rectified voltage, full-wave rectified voltage, voltage supplied from a battery or other DC switching power source, a DC converter such as a buck or boost converter, voltage supplied from a DC dynamo or other generator, voltage from photovoltaic panels, voltage output by fuel cells, or the like.

With continued reference to FIG. 1, in some embodiments, charging connector may include an AC pin. An AC pin supplies AC power. For the purposes of this disclosure, "AC power" refers to electrical power provided with a bi-directional flow of charge, where the flow of charge is periodically reversed. AC pin may supply AC power at a variety of frequencies. For example, in a non-limiting embodiment, AC pin may supply AC power with a frequency of 50 Hz. In another non-limiting embodiment, AC pin may supply AC power with a frequency of 60 Hz. One of ordinary skill in the art, upon reviewing the entirety of this disclosure, would realize that AC pin may supply a wide variety of frequencies. AC power produces a waveform when it is plotted out on a current vs. time or voltage vs. time graph. In some embodiments, the waveform of the AC power supplied by AC pin may be a sine wave. In other embodiments, the waveform of the AC power supplied by AC pin may be a square wave. In some embodiments, the waveform of the AC power supplied by AC pin may be a triangle wave. In yet other embodiments, the waveform of the AC power supplied by AC pin may be a sawtooth wave. The AC power supplied by AC pin may, in general have any waveform, so long as the wave form produces a bi-directional flow of charge. AC power may be provided without limitation, from alternating current generators, "mains" power provided over an AC power network from power plants, AC power output by AC voltage converters including transformer-based converters, and/or AC power output by inverters that convert DC power, as described above, into AC power. For the purposes of this disclosure, "supply," "supplies," "supplying," and the like, include both currently supplying and capable of supplying. For example, a live pin that "supplies" DC power need not be currently supplying DC power, it can also be capable of supplying DC power.

With continued reference to FIG. 1, in some embodiments, charging connector 112 may include a ground pin. A ground pin is an electronic connector that is connected to ground. For the purpose of this disclosure, "ground" is the reference point from which all voltages for a circuit are measured. "Ground" can include both a connection the earth, or a chassis ground, where all of the metallic parts in a device are electrically connected together. In some embodiments, "ground" can be a floating ground. Ground may alternatively or additionally refer to a "common" channel or "return" channel in some electronic systems. For instance, a chassis ground may be a floating ground when the potential is not equal to earth ground. In some embodiments, a negative pole in a DC circuit may be grounded. A "grounded connection," for the purposes of this disclosure, is an electrical connection to "ground." A circuit may be grounded in order to increase safety in the event that a fault develops, to absorb and reduce static charge, and the like. Speaking generally, a grounded connection allows electricity to pass through the grounded connection to ground instead of through, for example, a human that has come into contact with the circuit. Additionally, grounding a circuit helps to stabilize voltages within the circuit.

With continued reference to FIG. 1, in some embodiments, charging connector 112 may include a communication pin. A communication pin is an electric connector configured to carry electric signals between components of charging system 100 and components of an electric aircraft. As a non-limiting example, communication pin may carry signals from a controller in a charging system (e.g. controller 204) to a controller onboard an electric aircraft such as a flight controller or battery management controller. A person of ordinary skill in the art would recognize, after having reviewed the entirety of this disclosure, that communication pin could be used to carry a variety of signals between components.

With continued reference to FIG. 1, charging connector 112 may include a variety of additional pins. As a non-limiting example, charging connector 112 may include a proximity detection pin. Proximity detection pin has no current flowing through it when charging connector 112 is not connected to a port. Once charging connector 112 is connected to a port, then proximity detection pin will have current flowing through it, allowing for the controller to detect, using this current flow, that the charging connector 112 is connected to a port.

With continued reference to FIG. 1, system 100 include a cable reel module 116. The cable reel module 116 including a reel 120. For the purposes of this disclosure, "a cable reel module" is the portion of a charging system containing a reel, that houses a charging cable when the charging cable is stowed. For the purposes of this disclosure, a "reel" is a rotary device around which an object may be wrapped. Reel 120 is rotatably mounted to cable reel module 116. For the purposes of this disclosure, "rotatably mounted" means mounted such that the mounted object may rotate with respect to the object that the mounted object is mounted on. Additionally, when the charging cable 108 is in a stowed configuration, the charging cable is wound around reel 120. As a non-limiting example, charging cable 108 is in the stowed configuration in FIG. 1. In the stowed configuration, charging cable 108 need not be completely wound around reel 120. As a non-limiting example, a portion of charging cable 108 may hang free from reel 120 even when charging cable 108 is in the stowed configuration.

With continued reference to FIG. 1, cable reel module 116 includes a rotation mechanism 124. A "rotation mechanism," for the purposes of this disclosure is a mechanism that is configured to cause another object to undergo rotary motion. As a non-limiting example, rotation mechanism may include a rotary actuator. As a non-limiting example, rotation mechanism 124 may include an electric motor. As another non-limiting example, rotation mechanism 124 may include a servomotor. As yet another non-limiting example, rotation mechanism 124 may include a stepper motor. In some embodiments, rotation mechanism 124 may include a compliant element. For the purposes of this disclosure, a "compliant element" is an element that creates force through elastic deformation. As a non-limiting example, rotation mechanism 124 may include a torsional spring, wherein the torsional spring may elastically deform when reel 120 is rotated in, for example, the forward direction; this would cause the torsional spring to exert torque on reel 120, causing reel 120 to rotate in a reverse direction when it has been released. Rotation mechanism 124 is configured to rotate reel 120 in a reverse direction. In some embodiments, rotation mechanism 124 may be configured to rotate reel 120 in a forward direction. Forward direction and reverse direction are opposite directions of rotation. As a non-limiting example, the forward direction may be clockwise, whereas the reverse direction may be counterclockwise, or vice versa. As a non-limiting example, rotating in the forward direction may cause charging cable 108 to extend, whereas rotating in the reverse direction may cause charging cable 108 to stow, or vice versa. In some embodiments, rotation mechanism 124 may continually rotate reel 120 when rotation mechanism 124 is enabled. In some embodiments, rotation mechanism 124 may be configured to rotate reel 120 by a specific number of degrees. In some embodiments, rotation mechanism 124 may be configured to output a specific torque to reel 120. As a non-limiting example, this may be the case, wherein rotation mechanism 124 is a torque motor. Rotation mechanism 124 may be electrically connected to energy source 104.

With continued reference to FIG. 1, cable reel module 116 may include an outer case 128. Outer case 128 may enclose reel 120 and rotation mechanism 124. In some embodiments, outer case 128 may enclose charging cable 108 and possibly charging connector 112 when the charging cable 108 is in its stowed configuration.

With continued reference to FIG. 1, system 100 may include a control panel 132. For the purposes of this disclosure, a "control panel" is a panel containing a set of controls for a device. Control panel 132 may include a display 136, a reel toggle 140, and a reel locking toggle 144. For the purposes of this disclosure, a "display" is an electronic device for the visual presentation of information. Display 136 may be any type of screen. As non-limiting examples, display 136 may be an LED screen, an LCD screen, an OLED screen, a CRT screen, a DLPT screen, a plasma screen, a cold cathode display, a heated cathode display, a nixie tube display, and the like. Display 136 may be configured to display any relevant information. A person of ordinary skill in the art would appreciate, after having reviewed the entirety of this disclosure, that a variety of information could be displayed on display 136. In some embodiments, display 136 may display metrics associated with the charging of an electric aircraft. As a non-limiting example, this may include energy transferred. As another non-limiting example, this may include charge time remaining. As another non-limiting example, this may include charge time elapsed.

With continued reference to FIG. 1, reel toggle 140 may be configured to send a first toggle signal to a controller, wherein the first toggle signal may cause the controller to send a retraction signal. A "toggle" for the purposes of this disclosure, is a device or signal, configured to change a mechanism or device between at least two states. A "reel toggle," for the purposes of this disclosure, is a toggle that changes or alters, directly or indirectly, the rotation of a reel. Reel toggle 140, the controller, and the retraction signal are further discussed with reference to FIG. 2. In some embodiments, reel toggle 140 may be a button, wherein pressing the button causes reel toggle 140 to send the first toggle signal. In some embodiments, reel toggle 140 may be configured to send a second toggle signal to the controller, wherein the second signal causes the controller to send an extension signal. Second toggle signal and extension signal are discussed further with reference to FIG. 2. In some embodiments, reel toggle may be disposed on outer case 128 of cable reel module 116. In some embodiments, reel toggle may be disposed on charging connector 112.

With continued reference to FIG. 1, reel locking toggle 144 may be configured to send a reel locking toggle signal to a controller, wherein receiving the reel locking toggle signal may cause the controller to send an unlocking signal to a locking mechanism. A "reel locking toggle," for the purposes of this disclosure, is a toggle that changes or alters, directly or indirectly, the state of a locking mechanism. A "reel locking toggle signal," for the purposes of this disclosure, is a signal send by a reel locking toggle, wherein the reel locking toggle signal causes, directly or indirectly, a change or altercation of a locking mechanism. Receiving the unlocking signal may cause the locking mechanism to enter its disengaged state. Reel locking toggle 144, reel locking toggle signal, controller, and unlocking signal are discussed further with reference to FIG. 1. The locking mechanism is discussed further with reference to FIG. 3. In some embodiments, reel locking toggle may be disposed on outer case 128 of cable reel module 116. In some embodiments, reel locking toggle may be disposed on charging connector 112.

With continued reference to FIG. 1, a variety of devices may be used for reel toggle 140 and/or reel locking toggle 144. In some embodiments, reel toggle 140 and/or reel locking toggle 144 may each include a button. As non-limiting examples, the button may be a mechanical button, a resistive button, a capacitive button, and the like. As a another nonlimiting example, the button may be a virtual button on a touchscreen. In some embodiments, reel toggle 140 and/or reel locking toggle 144 may each include a dial. The dial may include any number of positions, or it may be a continuous dial. In some embodiments, the dial may have 2 positions, wherein one position may be disengaged, and the second position may be engaged, and thus cause a toggle signal to be sent to the controller. In some embodiments, the dial may include an additional third position, wherein the second position causes the first toggle signal to be sent and the second position causes the second toggle signal to be sent. In some embodiments, reel toggle 140 and/or reel locking toggle 144 may each include a rocker switch. In some embodiments, the rocker switch may have 2 positions, wherein one position may be disengaged, and the second position may be engaged, and thus cause a toggle signal to be sent to the controller. In some embodiments, the rocker switch may include an additional third position, wherein the second position causes the first toggle signal to be sent and the second position causes the second toggle signal to be sent. One of ordinary skill in the art would appreciate, after having reviewed the entirety of this disclosure, that a variety of possible devices may be suitable for use as reel toggle 140 and/or reel locking toggle 144.

Figure 2:
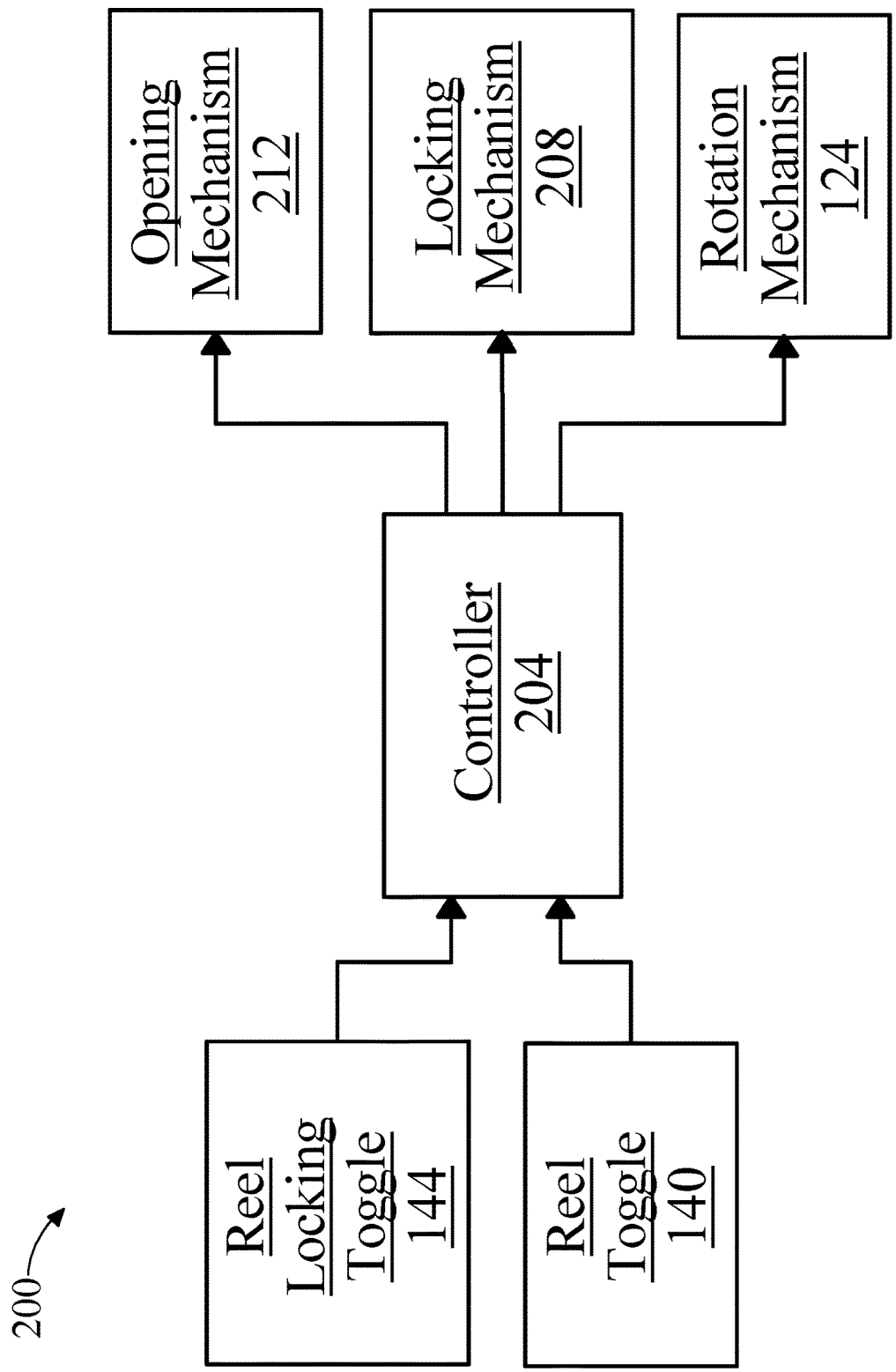
FIG. 2 is a block diagram of an exemplary control system for an electric aircraft charging system.

Referring now to FIG. 2, an exemplary embodiment of control system for an electric aircraft charging system 200 is shown. System 200, includes a controller 204. Controller 204 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller 204 may include a single computing device operating independently, or may include two or more computing device operating in concert, in parallel, sequentially or the like; two or more computing devices may be included together in a single computing device or in two or more computing devices. Controller 204 may interface or communicate with one or more additional devices as described below in further detail via a network interface device. Network interface device may be utilized for connecting controller 204 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. controller 204 may include but is not limited to, for example, a computing device or cluster of computing devices in a first location and a second computing device or cluster of computing devices in a second location. controller 204 may include one or more computing devices dedicated to data storage, security, distribution of traffic for load balancing, and the like. controller 204 may distribute one or more computing tasks as described below across a plurality of computing devices of computing device, which may operate in parallel, in series, redundantly, or in any other manner used for distribution of tasks or memory between computing devices. controller 204 may be implemented using a "shared nothing" architecture in which data is cached at the worker, in an embodiment, this may enable scalability of system 100 and/or computing device.

With continued reference to FIG. 2, controller 204 may be designed and/or configured to perform any method, method step, or sequence of method steps in any embodiment described in this disclosure, in any order and with any degree of repetition. For instance, controller 204 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. controller 204 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 2, controller 204 is communicatively connected to rotation mechanism 124. Controller 204 may be communicatively connected to a locking mechanism 208. Controller 204 may be communicatively connected to an opening mechanism 212. "Communicatively connected," for the purpose of this disclosure, means connected such that data can be transmitted, whether wirelessly or wired. Controller 204 may be configured to send an extension signal to rotation mechanism 124. The extension signal may cause rotation mechanism 124 rotate reel 120 in a forward direction. Controller 204 is also configured to send a retraction signal to rotation mechanism 124. The retraction signal causes rotation mechanism 124 to rotate reel 120 in a reverse direction. Forward direction and reverse direction may be consistent with any forward direction and reverse direction, respectively, disclosed as part of this disclosure. In some embodiments, controller 204 may be further configured to send a locking signal to the locking mechanism 208, wherein the locking signal causes the locking mechanism to enter its engaged state. In some embodiments, controller 204 may be further configured to controller to send an unlocking signal to locking mechanism 208, wherein the unlocking signal causes locking mechanism 208 to enter its disengaged state. Locking mechanism is further described with reference to FIG. 3.

With continued reference to FIG. 2, system 200 may further include a reel toggle 140. Reel toggle 140 may be communicatively connected to controller 204. Reel toggle 140 may be configured to send a first toggle signal to controller 204. The first toggle signal may cause controller 204 to send the retraction signal. In some embodiments, reel toggle 140 may be configured to send a first toggle signal to controller 204 for as long as reel toggle 140 is pressed or otherwise engaged. Furthermore, controller 204 may be configured to send the retraction signal to rotation mechanism 124 so long as controller 204 is receiving the first toggle signal. In this way, a user may control when rotation mechanism 124 retracts charging cable 108 be engaging and disengaging reel toggle 140. In other embodiments, engaging reel toggle once, for any amount of time, may be sufficient to fully stow charging cable 108. In some embodiments, reel toggle 140 may be configured to send a second toggle signal to controller 204. Second toggle signal may cause controller 204 to send an extension signal. Extension signal may be sent by controller 204 to rotation mechanism 124. In some embodiments, reel toggle 140 may be configured to send a second toggle signal to controller 204 for as long as reel toggle 140 is pressed or otherwise engaged. Furthermore, controller 204 may be configured to send the extension signal to rotation mechanism 124 so long as controller 204 is receiving the second toggle signal. In this way, a user may control when rotation mechanism 124 extends charging cable 108 be engaging and disengaging reel toggle 140. In some embodiments, pushing or otherwise engaging reel toggle 140 may cause reel toggle 140 to send either first reel toggle signal or second toggle signal, depending on the last signal that was send by reel toggle 140. As a non-limiting example, if reel toggle 140 is pressed or otherwise engaged a first time, it may send a first toggle signal and if reel toggle 140 is pressed or otherwise engaged a second time, reel toggle 140 may send a second toggle signal. In some embodiments, if reel toggle 140 is pushed or otherwise engaged a third time, reel toggle 140 may send the first toggle signal.

With continued reference to FIG. 2, system 200 may further include a reel locking toggle 144. Reel locking toggle 144 may be communicatively connected to controller 204. Reel locking toggle 144 may be configured to send a reel locking toggle signal to controller 204. The reel locking toggle signal may cause controller 204 to send the unlocking signal.

Figure 3:
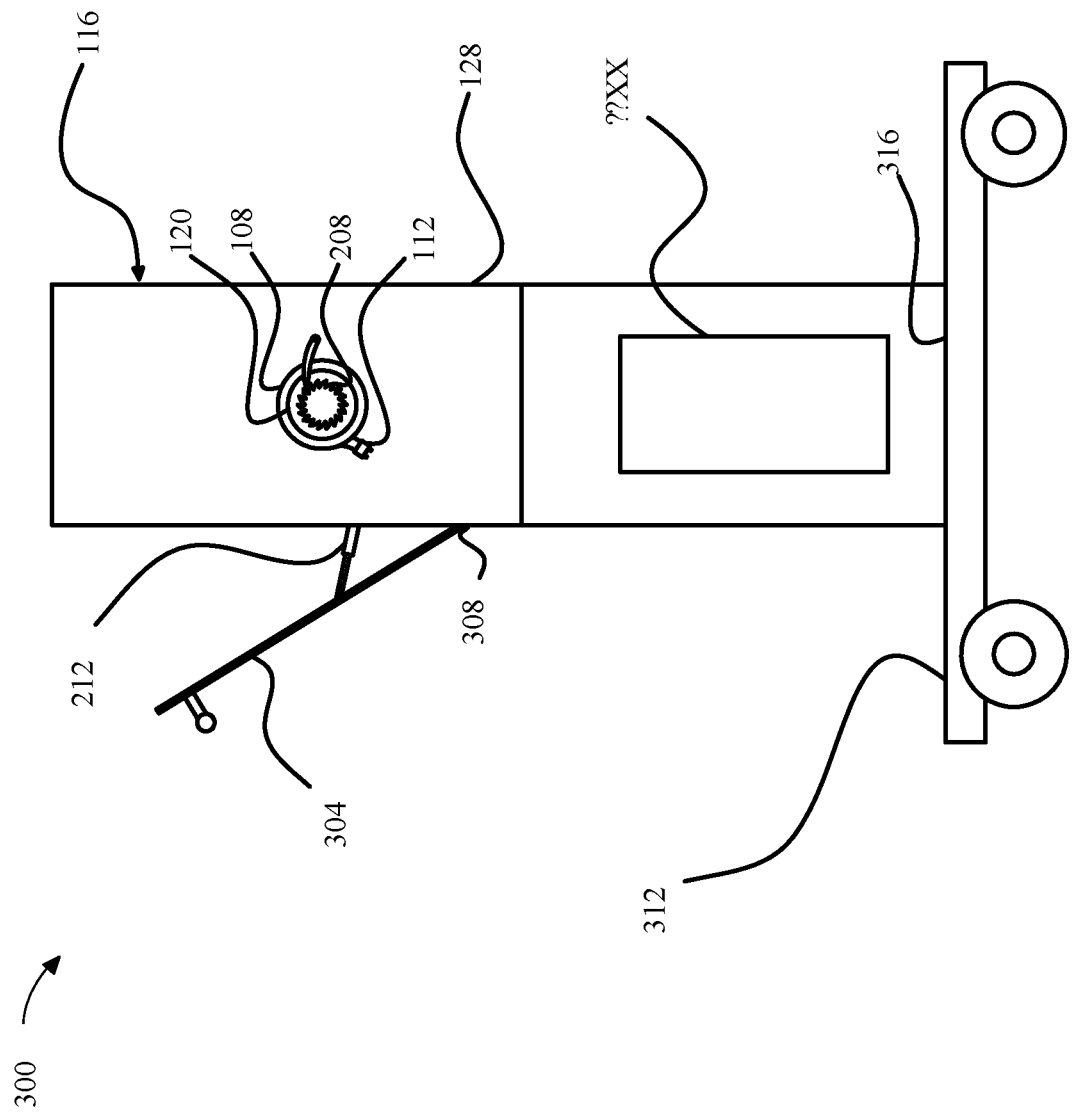
FIG. 3 is a diagram of an exemplary embodiment of an electric aircraft charging system with a cable reel module door.

Referring now to FIG. 3, an exemplary embodiment of an electric aircraft charging system 300 is shown. System 300 includes cable reel module 116, outer case 128, charging cable 108, charging connector 112, energy source 104, reel 120, locking mechanism 208, and opening mechanism 212. In some embodiments, locking mechanism 208 may have an engaged state and a disengaged state. In some embodiments, when locking mechanism 208 is in the engaged state, reel 120 is unable to rotate in a direction of the forward direction and the reverse direction. In some embodiments, locking mechanism 208 may prevent reel 120 from rotating in a forward direction when locking mechanism 208 is in its engaged state. In some embodiments, locking mechanism 208 may prevent reel 120 from rotating in a reverse direction when locking mechanism 208 is in its engaged state.

With continued reference to FIG. 3, in some embodiments, controller 204 may be communicatively connected to an opening mechanism 212. For the purposes of this disclosure, an "opening mechanism" is a mechanism or device configured to move a door from a closed position to an open position, or vice versa. In some embodiments, controller 204 may be configured to send a door open signal to opening mechanism 212, wherein the door open signal may cause opening mechanism 212 to move a cable reel module door from a closed position to an open position. In some embodiments, controller 204 may be configured to send a door close signal to opening mechanism 212, wherein the door close signal may cause opening mechanism 212 to move the cable reel module door from the open position to the closed position.

With continued reference to FIG. 3, in some embodiment, locking mechanism 208 may include a rachet. A "rachet," for the purposes of this disclosure, is a device that allows rotation in one direction, but mechanically opposes rotation in the other direction. In some embodiments, the rachet may include a toothed gear and a pawl. Each tooth on the gear may have a side with a steep slope and a side with a milder slope. In some embodiments, some side of the teeth may be curved. As a non-limiting example, as the reel rotates, one end of the pawl may slide over the side of the teeth with the milder slope. Furthermore, if the reel switches its direction of rotation, then the pawl will be unable to move over the side of the teeth with the steep slope and will be stuck. Therefore, in these embodiments, the rachet may allow rotation in one direction, but prevent rotation in the other direction. In some embodiments, the pawl may be actuated such that it can be moved or rotated out of contact with the gear, such that reel can rotate freely.

With continued reference to FIG. 3, in some embodiments, locking mechanism 208 may include an electromagnetic lock. In some embodiments, the electromagnetic lock, may be configured to stop rotation of reel 120 in any direction when current is supplied to an electromagnet, and prevent rotation of reel 120 when current is not supplied to the electromagnet. In other embodiments, the electromagnetic lock may be configured to allow rotation of reel 120 in any direction when current is not supplied to the electromagnetic lock, and prevent rotation of reel 120 when current is supplied to the electromagnetic lock.

With continued reference to FIG. 3, in some embodiments, locking mechanism 208 may include a rod or key designed to mechanically interface with reel 120 when locking mechanism 208 is engaged in order to prevent rotation of the reel. In some embodiments, locking mechanism may be a switch or relay configured to prevent rotation mechanism 124 from receiving power.

With continued reference to FIG. 3, cable reel module 116 includes a cable reel module door 304. Cable reel module door 304 has a closed position and an open position. When the cable reel module door 304 is in the closed position, it prevents access to reel 120. As a non-limiting example, when cable reel module door 304 is in the closed position, outer case 128 and cable reel module door 304 may together completely encapsulate reel 120. When cable reel module door 304 is in the open position, it allows access to reel 120. As a non-limiting example, when cable reel module door 304 is in the open position, there may be an opening in outer case 128 through which reel 120 may be accessed. In some embodiments, when cable reel module door 304 is in its open position, cable reel module door 304 may provide an opening spanning at least two adjacent sides of the plurality of sides of outer case 128. For example, in its open position, cable reel module door 304 may provide an opening on the front and top of cable reel module 116, wherein front and top are defined with reference to FIG. 1. In some embodiments, in its open position, cable reel module door 304 may provide an opening on the front and left side of cable reel module 116, wherein the front and left side are defined with reference to FIG. 1. In some embodiments, cable reel module door 304 may include a hinge, wherein the hinge hingidly connects two panels of cable reel module door 304. In some embodiments, cable reel module door 304 may be hingidly attached to cable reel module 116 by a hinge 308. Hinge 308 may allow cable reel module door 304 to move between its open and closed positions. In some embodiments, cable reel module door 304 may be mounted on a track or set of tracks disposed on cable reel module 116, such that cable reel module door 304 may be slid on the track or set of tracks between its open position and its closed position. One of ordinary skill in the art, after having reviewed the entirety of this disclosure, would appreciate that cable reel module door 304 may have a variety of different shapes and designs.

With continued reference to FIG. 3, in some embodiments cable reel module door 304 may include opening mechanism 212. Opening mechanism 212 may be configured to move cable reel module door 304 from its closed position to its open position when opening mechanism 212 receives a door open signal. Opening mechanism 212 may be configured to move cable reel module door 304 from its open position to its closed position when opening mechanism 212 receives a door close signal. One of ordinary skill in the art would appreciate, after having reviewed the entirety of this disclosure, that a variety of opening mechanisms 212 are suitable for this application. As a non-limiting example, opening mechanism 212 may include a pneumatic cylinder. As another non-limiting example, opening mechanism 212 may include a hydraulic cylinder. As another non-limiting example, opening mechanism 212 may include a spring; in some embodiments, the spring may be biased to either move the cable reel module door 304 from its open position to its closed position or from its closed position to its open position when the spring is released. As yet another non-limiting example, opening mechanism 212 may include an electromechanical device such as an actuator, wherein the actuator may be consistent with any actuator disclosed as part of this disclosure. In some embodiments, as a non-limiting example, the actuator may be a linear actuator. In some embodiments, as another non-limiting example, the actuator may be a rotary actuator.

With continued reference to FIG. 3, system 300 may include a moveable platform 312. In some embodiments, charging cable 108, energy source 104, cable reel module 116 may be located on top of moveable platform 312. In some embodiments, the rest of system 300, other than moveable platform 312 may be located on top of moveable platform 312. In some embodiments, a charging system base 316 may be connected to the top of moveable platform 312. In some embodiments, charging system base 316 may be removably connected to the top of moveable platform 312. In some embodiments, moveable platform 312 may be motorized. For the purposes of this disclosure, moveable platform 312 may be "motorized" when it includes a motor that is configured to cause the horizontal translation of moveable platform 312. As non-limiting example, a motorized moveable platform 312, in some embodiments, may be a car, a truck, a buggy, a motorized cart, a tug, a baggage tug, and the like. In some embodiments, moveable platform 312 may be remote controlled. For the purposes of this disclosure, moveable platform is "remote controlled" when it receives commands from a remote device, where in the commands cause the moveable platform to move. In some embodiments, the commands may be received wirelessly, such as by radio, IR, 3G, 4G, LTE, internet, Bluetooth, and the like. In some embodiments, a remote control may send the commands to moveable platform. In some embodiments, the commands may be sent by a computing device as described in this disclosure. In some embodiments, the commands may be sent by a controller or flight controller on board an electric aircraft.

Figure 4:
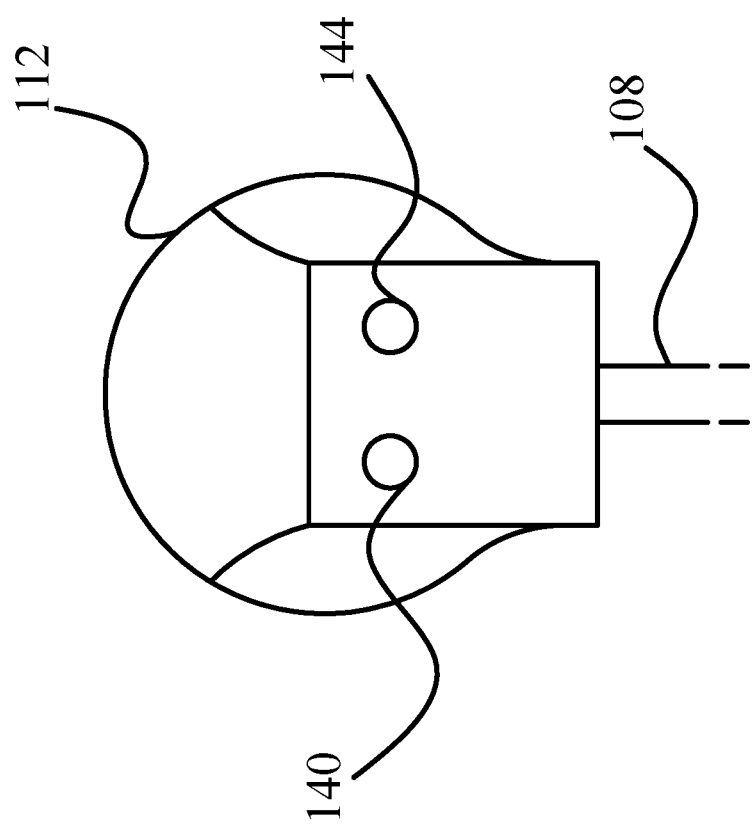
FIG. 4 is a diagram of an exemplary charging connector.

Referring now to FIG. 4, an exemplary embodiment of charging connector 112 is depicted. Charging connector 112 is electrically connected to charging cable 108. Reel toggle 140 and reel locking toggle 144 may be disposed on the surface of charging connector 112. In some embodiments, charging connector may have a handle portion on which reel toggle 140 and reel locking toggle may be disposed. In some embodiments, reel toggle 140 and cable reel toggle 140 may be disposed on charging connector 112 such that a user that is holding charging connector is able to easily reach and use reel toggle 140 and cable reel toggle 140.

Figure 5:
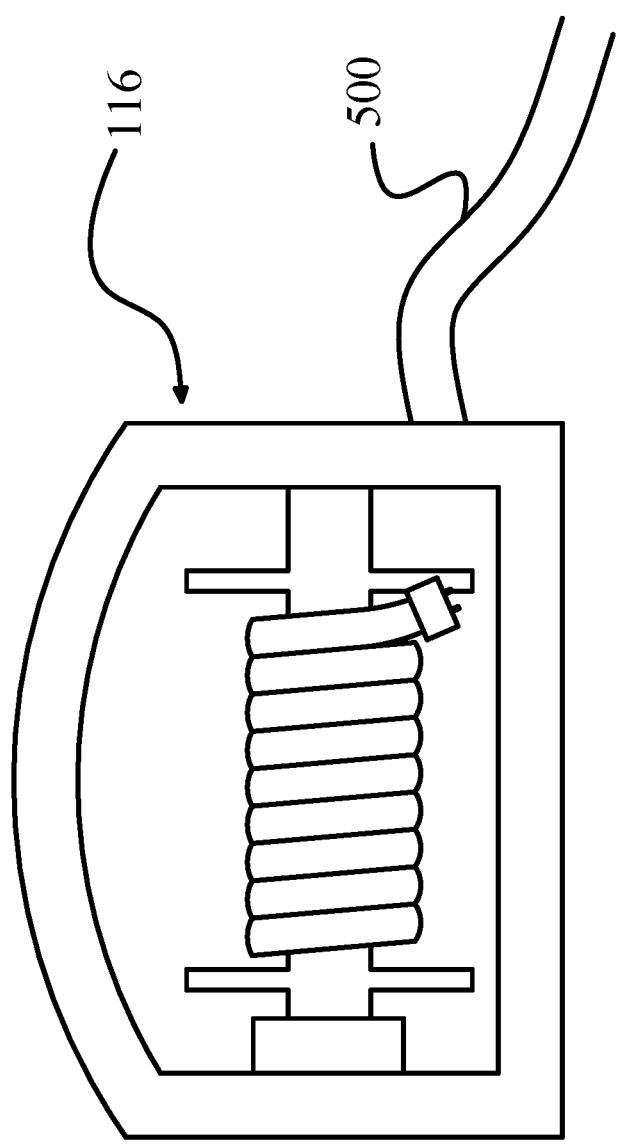
FIG. 5 is a diagram of an exemplary cable reel module with external connection.

Referring now to FIG. 5, an exemplary embodiment of cable reel module 116 is shown. Cable reel module 116 may be electrically and/or communicatively connected to external connection 500. External connection 500 may be an electrical cord. External connection 500 may electrically connect cable reel module 116 to an energy source, such as energy source 104. In some embodiments, external connection 500 may communicatively connect cable reel module 116 to a controller, such as controller 204. In this embodiment, with external connection 500, cable reel module may be moved relative to energy source 104. This may result in greater mobility for cable reel module 116.

Figure 6:
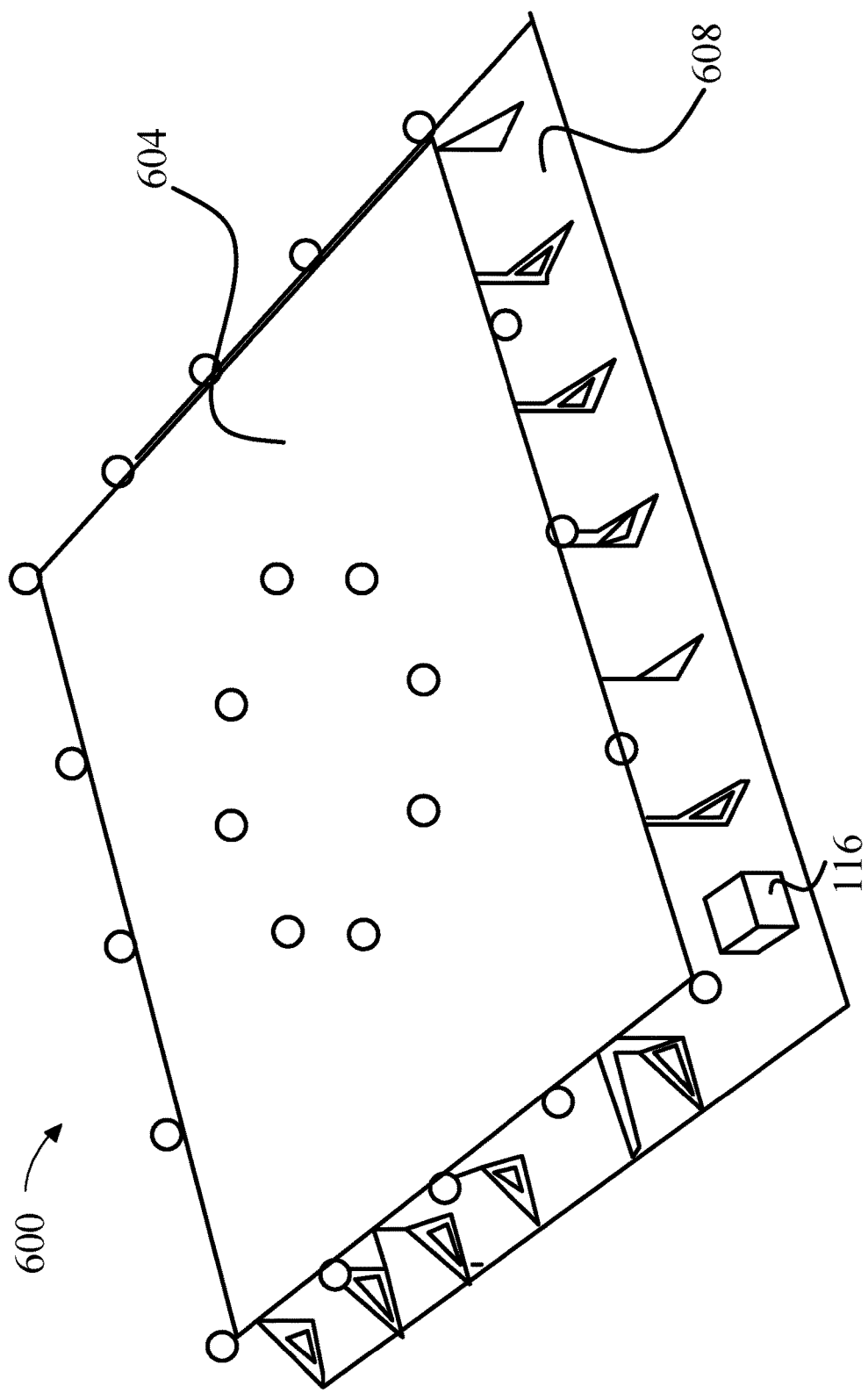
FIG. 6 is a diagram of an exemplary helipad.

Referring now to FIG. 6, a helipad 600 is depicted. For the purposes of this disclosure, a "helipad" is a structure adapted for the vertical landings of aircraft. In some embodiments, cable reel module 116 may be disposed on helipad 600. In some embodiments, helipad 600 may include a landing surface 604. In some embodiments, landing surface 604 may be a substantially horizontal, planar surface. For the purposes of this disclosure, "substantially horizontal" means that an object differs no more than an average of 5 degrees from horizontal. In some embodiment, landing surface 604 may be large enough to accommodate an electric aircraft. As a non-limiting example, landing surface 604 may be 1000 square feet. As another non-limiting example, landing surface may be 2000 square feet. As another non-limiting example, landing surface 604 may be 3000 square feet. As yet another non-limiting example, landing surface 604 may be 800 square feet. In some embodiments, cable reel module 116 may be disposed at an elevation less than that of the landing surface 604. For the purposes of this disclosure, the elevation of cable reel module 116 is measured from the top of cable reel module 116. In some embodiments, cable reel module 116 may be disposed on a lower surface 608. Lower surface 608 may be a surface at a lower elevation that landing surface 604. In some embodiments, where cable reel module 116 is disposed on lower surface 608, cable reel module 116 may be at a lower elevation than landing surface 604.

With continued reference to FIG. 6, in some embodiments, helipad 600 may include a lift, configured to raise cable reel module 116, such that, in the raised position, cable reel module 116 is at an elevation higher than the elevation of landing surface 604. In some embodiments, lift may be consistent with any lift disclosed in U.S. Ser. No. 17/736,574, titled "METHODS AND SYSTEMS FOR CHARGING AN ELECTRIC AIRCRAFT INCLUDING A HORIZONTAL CABLE ARRANGEMENT", and filed on May 4, 2022, the entirety of which is hereby incorporated by reference. In some embodiments, lift may be consistent with any lift disclosed in U.S. Ser. No. 17/736,619, titled "METHODS AND SYSTEMS FOR CHARGING AN ELECTRIC AIRCRAFT INCLUDING A VERTICAL CABLE ARRANGEMENT", and filed on May 4, 2022, the entirety of which is hereby incorporated by reference.

Figure 7:
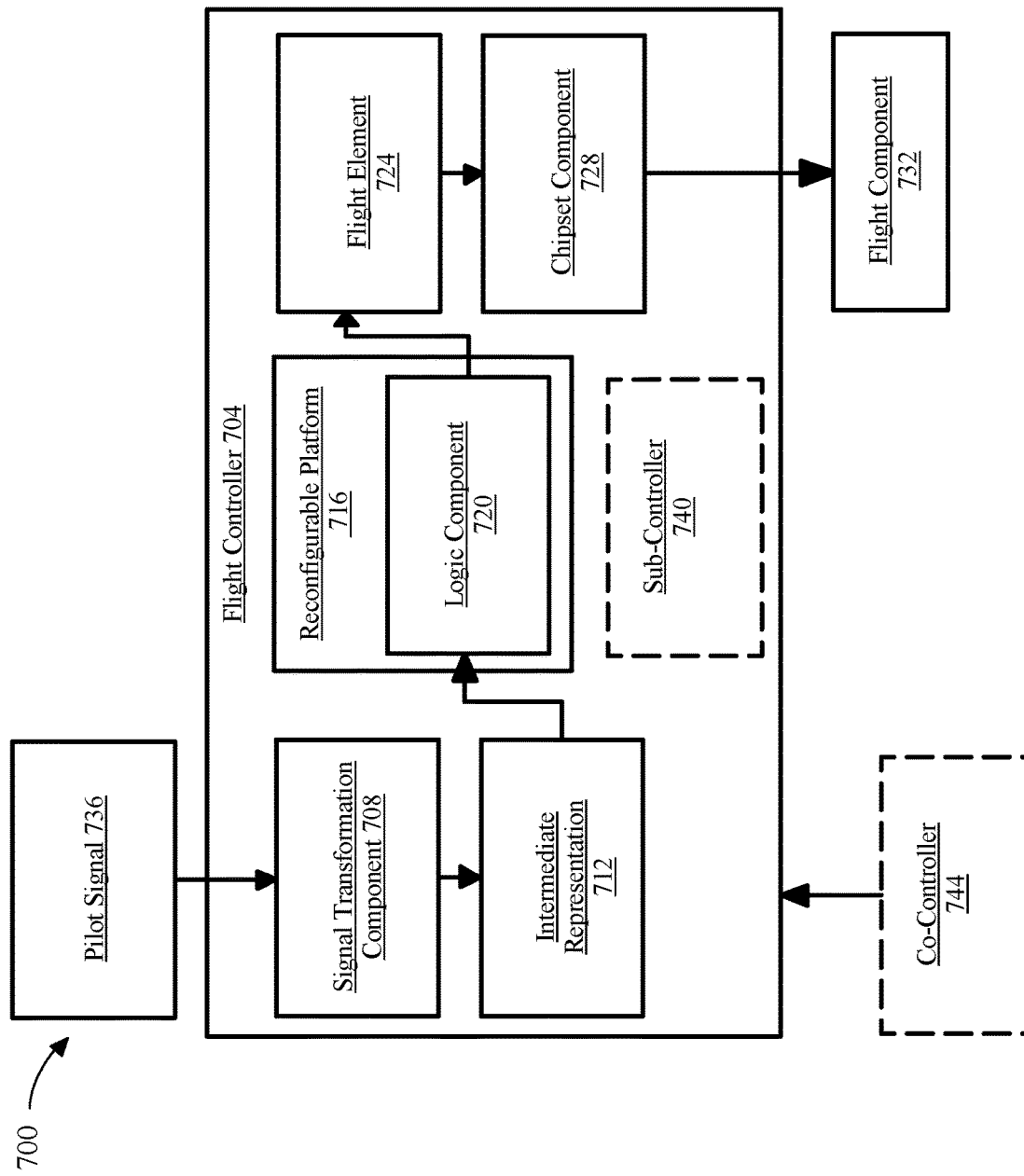
FIG. 7 is a block diagram of an exemplary flight controller.

Now referring to FIG. 7, an exemplary embodiment 700 of a flight controller 704 is illustrated. As used in this disclosure a "flight controller" is a computing device of a plurality of computing devices dedicated to data storage, security, distribution of traffic for load balancing, and flight instruction. Flight controller 704 may include and/or communicate with any computing device as described in this disclosure, including without limitation a microcontroller, microprocessor, digital signal processor (DSP) and/or system on a chip (SoC) as described in this disclosure. Further, flight controller 704 may include a single computing device operating independently, or may include two or more computing device operating in concert, in parallel, sequentially or the like; two or more computing devices may be included together in a single computing device or in two or more computing devices. In embodiments, flight controller 704 may be installed in an aircraft, may control the aircraft remotely, and/or may include an element installed in the aircraft and a remote element in communication therewith.

In an embodiment, and still referring to FIG. 7, flight controller 704 may include a signal transformation component 708. As used in this disclosure a "signal transformation component" is a component that transforms and/or converts a first signal to a second signal, wherein a signal may include one or more digital and/or analog signals. For example, and without limitation, signal transformation component 708 may be configured to perform one or more operations such as preprocessing, lexical analysis, parsing, semantic analysis, and the like thereof. In an embodiment, and without limitation, signal transformation component 708 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 708 may include transforming one or more low-level languages such as, but not limited to, machine languages and/or assembly languages. For example, and without limitation, signal transformation component 708 may include transforming a binary language signal to an assembly language signal. In an embodiment, and without limitation, signal transformation component 708 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 7, signal transformation component 708 may be configured to optimize an intermediate representation 712. As used in this disclosure an "intermediate representation" is a data structure and/or code that represents the input signal. Signal transformation component 708 may optimize intermediate representation as a function of a data-flow analysis, dependence analysis, alias analysis, pointer analysis, escape analysis, and the like thereof. In an embodiment, and without limitation, signal transformation component 708 may optimize intermediate representation 712 as a function of one or more inline expansions, dead code eliminations, constant propagation, loop transformations, and/or automatic parallelization functions. In another embodiment, signal transformation component 708 may optimize intermediate representation as a function of a machine dependent optimization such as a peephole optimization, wherein a peephole optimization may rewrite short sequences of code into more efficient sequences of code. Signal transformation component 708 may optimize intermediate representation to generate an output language, wherein an "output language," as used herein, is the native machine language of flight controller 704. For example, and without limitation, native machine language may include one or more binary and/or numerical languages.

In an embodiment, and without limitation, signal transformation component 708 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q-k-1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 7, flight controller 704 may include a reconfigurable hardware platform 716. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 716 may be reconfigured to enact any algorithm and/or algorithm selection process received from another computing device and/or created using machine-learning processes.

Still referring to FIG. 7, reconfigurable hardware platform 716 may include a logic component 720. As used in this disclosure a "logic component" is a component that executes instructions on output language. For example, and without limitation, logic component may perform basic arithmetic, logic, controlling, input/output operations, and the like thereof. Logic component 720 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 720 may be organized according to Von Neumann and/or Harvard architecture as a non-limiting example. Logic component 720 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 720 may include one or more integrated circuit microprocessors, which may contain one or more central processing units, central processors, and/or main processors, on a single metal-oxide-semiconductor chip. Logic component 720 may be configured to execute a sequence of stored instructions to be performed on the output language and/or intermediate representation 712. Logic component 720 may be configured to fetch and/or retrieve the instruction from a memory cache, wherein a "memory cache," as used in this disclosure, is a stored instruction set on flight controller 704. Logic component 720 may be configured to decode the instruction retrieved from the memory cache to opcodes and/or operands. Logic component 720 may be configured to execute the instruction on intermediate representation 712 and/or output language. For example, and without limitation, logic component 720 may be configured to execute an addition operation on intermediate representation 712 and/or output language.

In an embodiment, and without limitation, logic component 720 may be configured to calculate a flight element 724. As used in this disclosure a "flight element" is an element of datum denoting a relative status of aircraft. For example, and without limitation, flight element 724 may denote one or more torques, thrusts, airspeed velocities, forces, altitudes, groundspeed velocities, directions during flight, directions facing, forces, orientations, and the like thereof. For example, and without limitation, flight element 724 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 724 may denote that aircraft is following a flight path accurately and/or sufficiently.

Still referring to FIG. 7, flight controller 704 may include a chipset component 728. As used in this disclosure a "chipset component" is a component that manages data flow. In an embodiment, and without limitation, chipset component 728 may include a northbridge data flow path, wherein the northbridge dataflow path may manage data flow from logic component 720 to a high-speed device and/or component, such as a RAM, graphics controller, and the like thereof. In another embodiment, and without limitation, chipset component 728 may include a southbridge data flow path, wherein the southbridge dataflow path may manage data flow from logic component 720 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 728 may manage data flow between logic component 720, memory cache, and a flight component 732. As used in this disclosure a "flight component" is a portion of an aircraft that can be moved or adjusted to affect one or more flight elements. For example, flight component 732 may include a component used to affect the aircrafts' roll and pitch which may comprise one or more ailerons. As a further example, flight component 732 may include a rudder to control yaw of an aircraft. In an embodiment, chipset component 728 may be configured to communicate with a plurality of flight components as a function of flight element 724. For example, and without limitation, chipset component 728 may transmit to an aircraft rotor to reduce torque of a first lift propulsor and increase the forward thrust produced by a pusher component to perform a flight maneuver.

In an embodiment, and still referring to FIG. 7, flight controller 704 may be configured generate an autonomous function. As used in this disclosure an "autonomous function" is a mode and/or function of flight controller 704 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 724. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 704 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 704 will control the ailerons and/or rudders. As used in this disclosure "non-autonomous mode" is a mode that denotes a pilot will control aircraft and/or maneuvers of aircraft in its entirety.

In an embodiment, and still referring to FIG. 7, flight controller 704 may generate autonomous function as a function of an autonomous machine-learning model. As used in this disclosure an "autonomous machine-learning model" is a machine-learning model to produce an autonomous function output given flight element 724 and a pilot signal 736 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 736 may denote that a pilot is controlling and/or maneuvering ailerons, wherein the pilot is not in control of the rudders and/or propulsors. In an embodiment, pilot signal 736 may include an implicit signal and/or an explicit signal. For example, and without limitation, pilot signal 736 may include an explicit signal, wherein the pilot explicitly states there is a lack of control and/or desire for autonomous function. As a further non-limiting example, pilot signal 736 may include an explicit signal directing flight controller 704 to control and/or maintain a portion of aircraft, a portion of the flight plan, the entire aircraft, and/or the entire flight plan. As a further non-limiting example, pilot signal 736 may include an implicit signal, wherein flight controller 704 detects a lack of control such as by a malfunction, torque alteration, flight path deviation, and the like thereof. In an embodiment, and without limitation, pilot signal 736 may include one or more explicit signals to reduce torque, and/or one or more implicit signals that torque may be reduced due to reduction of airspeed velocity. In an embodiment, and without limitation, pilot signal 736 may include one or more local and/or global signals. For example, and without limitation, pilot signal 736 may include a local signal that is transmitted by a pilot and/or crew member. As a further non-limiting example, pilot signal 736 may include a global signal that is transmitted by air traffic control and/or one or more remote users that are in communication with the pilot of aircraft. In an embodiment, pilot signal 736 may be received as a function of a tri-state bus and/or multiplexor that denotes an explicit pilot signal should be transmitted prior to any implicit or global pilot signal.

Still referring to FIG. 7, autonomous machine-learning model may include one or more autonomous machine-learning processes such as supervised, unsupervised, or reinforcement machine-learning processes that flight controller 704 and/or a remote device may or may not use in the generation of autonomous function. As used in this disclosure "remote device" is an external device to flight controller 704. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 7, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 704 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 7, flight controller 704 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 704. Remote device and/or FPGA may transmit a signal, bit, datum, or parameter to flight controller 704 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 704 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 7, flight controller 704 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 7, flight controller 704 may include, but is not limited to, for example, a cluster of flight controllers in a first location and a second flight controller or cluster of flight controllers in a second location. Flight controller 704 may include one or more flight controllers dedicated to data storage, security, distribution of traffic for load balancing, and the like. Flight controller 704 may be configured to distribute one or more computing tasks as described below across a plurality of flight controllers, which may operate in parallel, in series, redundantly, or in any other manner used for distribution of tasks or memory between computing devices. For example, and without limitation, flight controller 704 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 7, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 732. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 7, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 704. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 712 and/or output language from logic component 720, wherein output language may include one or more analog-to-digital conversions, low bit rate transmissions, message encryptions, digital signals, binary signals, logic signals, analog signals, and the like thereof described above in detail.

Still referring to FIG. 7, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 7, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 7, flight controller 704 may also be implemented using a "shared nothing" architecture in which data is cached at the worker, in an embodiment, this may enable scalability of aircraft and/or computing device. Flight controller 704 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, a node may include, without limitation a plurality of inputs $x_i$ that may receive numerical values from inputs to a neural network containing the node and/or from other nodes. Node may perform a weighted sum of inputs using weights $w_1$ that are multiplied by respective inputs $x_1$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_1$ applied to an input $x_1$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_1$ may be determined by training a neural network using training data, which may be performed using any suitable process as described above. In an embodiment, and without limitation, a neural network may receive semantic units as inputs and output vectors representing such semantic units according to weights $w_1$ that are derived using machine-learning processes as described in this disclosure.

Still referring to FIG. 7, flight controller may include a sub-controller 740. As used in this disclosure a "sub-controller" is a controller and/or component that is part of a distributed controller as described above; for instance, flight controller 704 may be and/or include a distributed flight controller made up of one or more sub-controllers. For example, and without limitation, sub-controller 740 may include any controllers and/or components thereof that are similar to distributed flight controller and/or flight controller as described above. Sub-controller 740 may include any component of any flight controller as described above. Sub-controller 740 may be implemented in any manner suitable for implementation of a flight controller as described above. As a further non-limiting example, sub-controller 740 may include one or more processors, logic components and/or computing devices capable of receiving, processing, and/or transmitting data across the distributed flight controller as described above. As a further non-limiting example, sub-controller 740 may include a controller that receives a signal from a first flight controller and/or first distributed flight controller component and transmits the signal to a plurality of additional sub-controllers and/or flight components.

Still referring to FIG. 7, flight controller may include a co-controller 744. As used in this disclosure a "co-controller" is a controller and/or component that joins flight controller 704 as components and/or nodes of a distributer flight controller as described above. For example, and without limitation, co-controller 744 may include one or more controllers and/or components that are similar to flight controller 704. As a further non-limiting example, co-controller 744 may include any controller and/or component that joins flight controller 704 to distributer flight controller. As a further non-limiting example, co-controller 744 may include one or more processors, logic components and/or computing devices capable of receiving, processing, and/or transmitting data to and/or from flight controller 704 to distributed flight control system. Co-controller 744 may include any component of any flight controller as described above. Co-controller 744 may be implemented in any manner suitable for implementation of a flight controller as described above.

In an embodiment, and with continued reference to FIG. 7, flight controller 704 may be designed and/or configured to perform any method, method step, or sequence of method steps in any embodiment described in this disclosure, in any order and with any degree of repetition. For instance, flight controller 704 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 8:
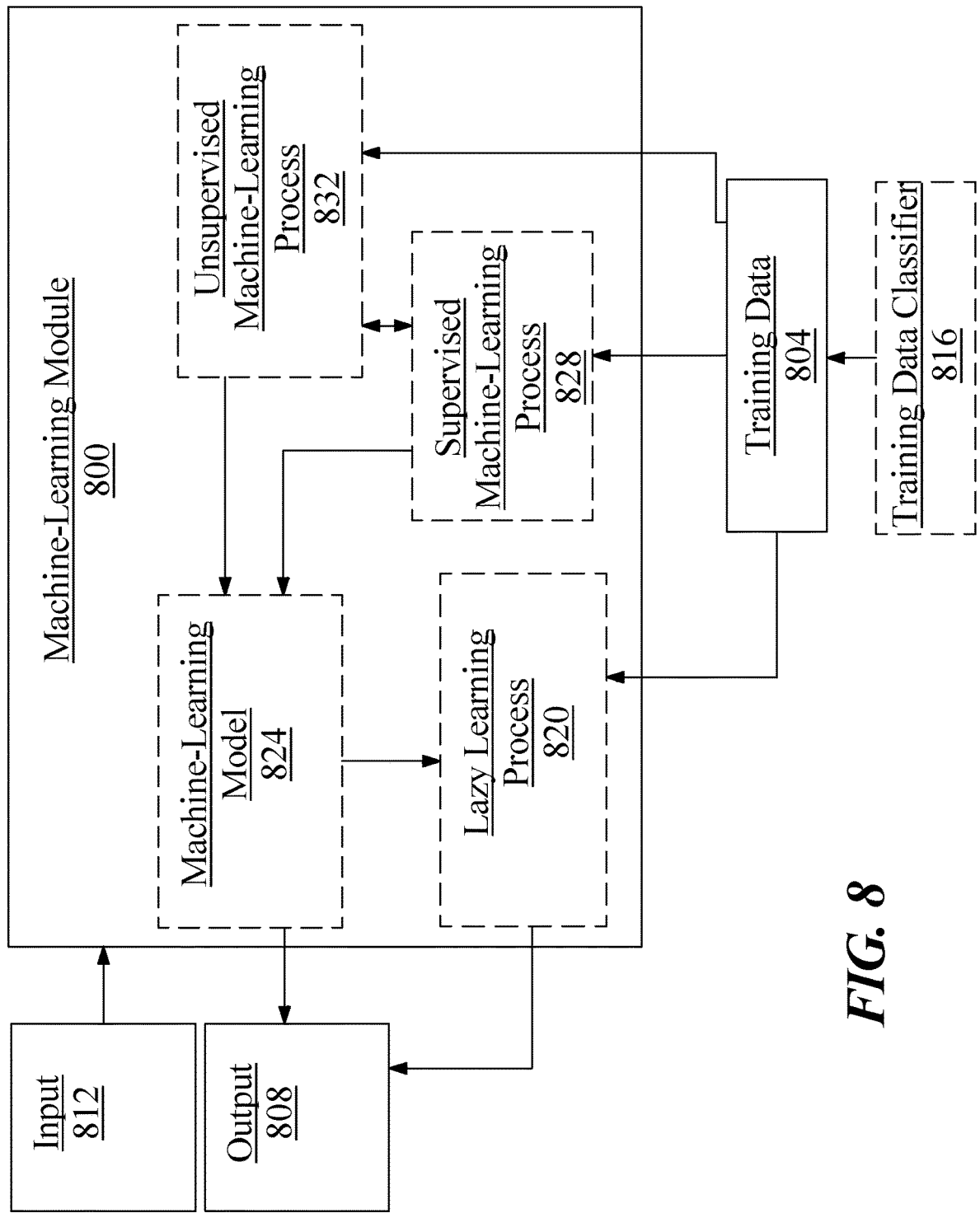
FIG. 8 is a block diagram of an exemplary machine learning model.

Referring now to FIG. 8, an exemplary embodiment of a machine-learning module 800 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 804 to generate an algorithm that will be performed by a computing device/module to produce outputs 808 given data provided as inputs 812; this is in contrast to a non-machine learning software program where the commands to be executed are determined in advance by a user and written in a programming language.

Still referring to FIG. 8, "training data," as used herein, is data containing correlations that a machine-learning process may use to model relationships between two or more categories of data elements. For instance, and without limitation, training data 804 may include a plurality of data entries, each entry representing a set of data elements that were recorded, received, and/or generated together; data elements may be correlated by shared existence in a given data entry, by proximity in a given data entry, or the like. Multiple data entries in training data 804 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 804 according to various correlations; correlations may indicate causative and/or predictive links between categories of data elements, which may be modeled as relationships such as mathematical relationships by machine-learning processes as described in further detail below. Training data 804 may be formatted and/or organized by categories of data elements, for instance by associating data elements with one or more descriptors corresponding to categories of data elements. As a non-limiting example, training data 804 may include data entered in standardized forms by persons or processes, such that entry of a given data element in a given field in a form may be mapped to one or more descriptors of categories. Elements in training data 804 may be linked to descriptors of categories by tags, tokens, or other data elements; for instance, and without limitation, training data 804 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 8, training data 804 may include one or more elements that are not categorized; that is, training data 804 may not be formatted or contain descriptors for some elements of data. Machine-learning algorithms and/or other processes may sort training data 804 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 804 to be made applicable for two or more distinct machine-learning algorithms as described in further detail below. Training data 804 used by machine-learning module 800 may correlate any input data as described in this disclosure to any output data as described in this disclosure. As a non-limiting illustrative example flight elements and/or pilot signals may be inputs, wherein an output may be an autonomous function.

Further referring to FIG. 8, training data may be filtered, sorted, and/or selected using one or more supervised and/or unsupervised machine-learning processes and/or models as described in further detail below; such models may include without limitation a training data classifier 816. Training data classifier 816 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 800 may generate a classifier using a classification algorithm, defined as a processes whereby a computing device and/or any module and/or component operating thereon derives a classifier from training data 804. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 8, machine-learning module 800 may be configured to perform a lazy-learning process 820 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 804. Heuristic may include selecting some number of highest-ranking associations and/or training data 804 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 8, machine-learning processes as described in this disclosure may be used to generate machine-learning models 824. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 824 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 824 may be generated by creating an artificial neural network, such as a convolutional neural network comprising an input layer of nodes, one or more intermediate layers, and an output layer of nodes. Connections between nodes may be created via the process of "training" the network, in which elements from a training data 804 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, machine-learning algorithms may include at least a supervised machine-learning process 828. At least a supervised machine-learning process 828, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 804. Persons skilled in the art, upon reviewing the entirety of this disclosure, will be aware of various possible variations of at least a supervised machine-learning process 828 that may be used to determine relation between inputs and outputs. Supervised machine-learning processes may include classification algorithms as defined above.

Further referring to FIG. 8, machine learning processes may include at least an unsupervised machine-learning processes 832. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 8, machine-learning module 800 may be designed and configured to create a machine-learning model 824 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 8, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
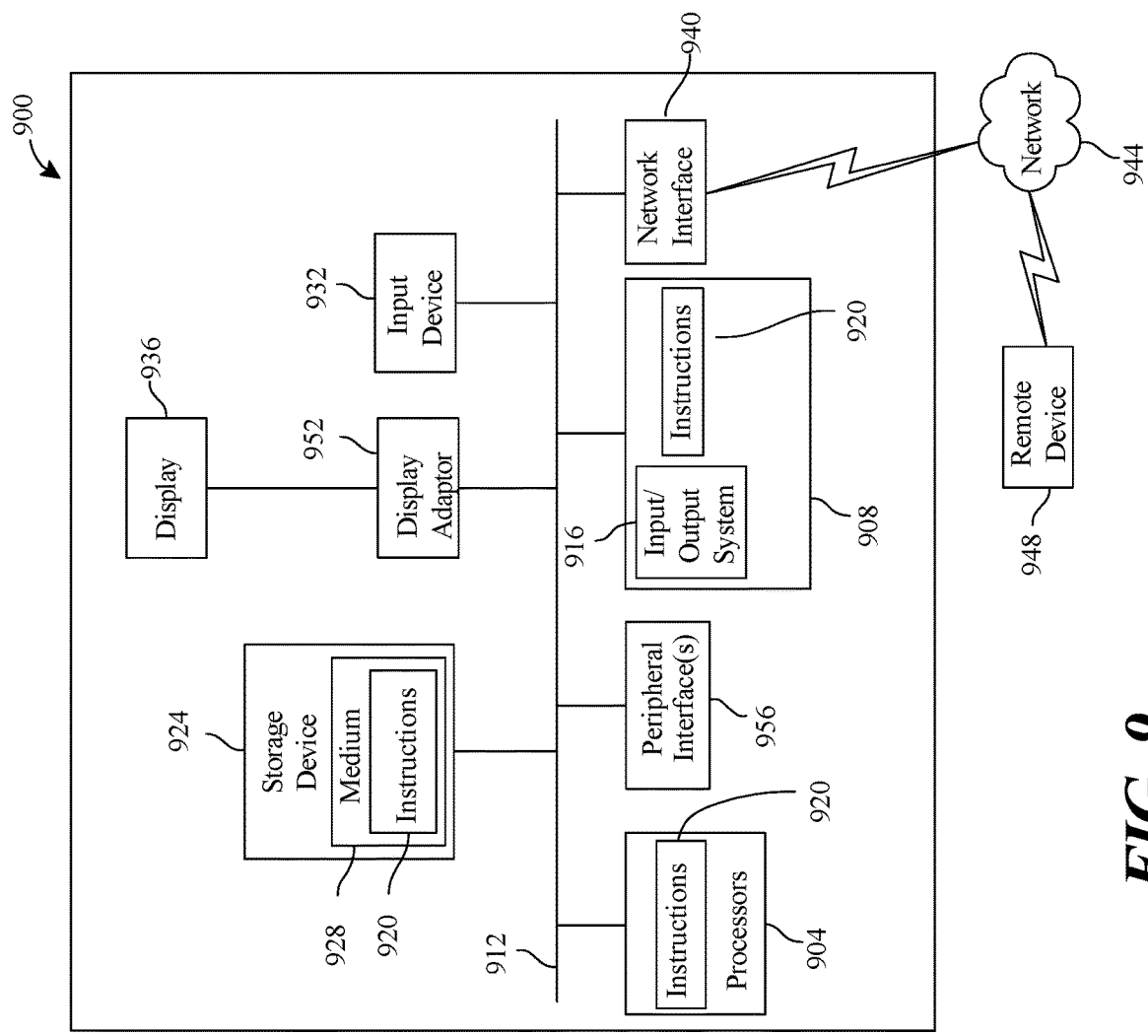
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An electric aircraft charging system, the system comprising:
a charging cable, the charging cable configured to carry electricity;
an energy source, wherein the energy source is electrically connected to the charging cable;
a cable reel module, the cable reel module comprising:
a reel, wherein:
the reel is rotatably mounted to the cable reel module, wherein the reel is configured to rotate in a forward direction and a reverse direction; and
the charging cable, in a stowed configuration, is wound around the reel;

a rotation mechanism, the rotation mechanism configured to rotate the reel in the reverse direction; and a cable reel module door comprising an opening and closing mechanism, wherein the opening and closing mechanism comprises an actuator, wherein the cable reel module door is configured to have a closed position as a function of the actuator and an open position as a function of the actuator, wherein the closed position prevents access to the reel and the open position allows access to the reel; and a controller communicatively connected to the rotation mechanism, the controller configured to send a retraction signal to the rotation mechanism, wherein the retraction signal causes the rotation mechanism to rotate the reel in the reverse direction.

2. The system of claim 1, wherein the cable reel module further comprises a locking mechanism, wherein the locking mechanism has an engaged state a disengaged state, wherein, when the locking mechanism is in the engaged state, the reel cannot rotate in at least a direction of the forward direction and the reverse direction.

3. The system of claim 2, wherein the locking mechanism is a rachet.

4. The system of claim 2, wherein:
the reel cannot rotate in the forward direction when the locking mechanism is in its engaged state; and
the reel cannot rotate in the reverse direction when the locking mechanism is in its engaged state.

5. The system of claim 2, wherein the controller is further configured to send a locking signal to the locking mechanism, wherein the locking signal causes the locking mechanism to enter its engaged state.

6. The system of claim 1, wherein:
the cable reel module comprises an outer case, the outer case enclosing the real and rotation mechanism, the outer case comprising a plurality of sides; and
the cable reel module door providing an opening spanning at least two adjacent sides of the plurality of sides when the cable reel module door is in its open position.

7. The system of claim 1, wherein the cable reel module door comprises an opening mechanism, wherein:
the opening mechanism is configured to move the cable reel module door from its closed position to its open position when the opening mechanism receives a door open signal; and
the opening mechanism is configured to move the cable reel module door from its open position to its closed position when the opening mechanism receives a door close signal.

8. The system of claim 1, wherein:
the rotation mechanism is further configured to rotate the reel in the forward direction; and
the controller is further configured to send an extension signal to the rotation mechanism, wherein the extension signal causes the rotation mechanism to rotate in the forward direction.

9. The system of claim 8, further comprising a reel toggle, wherein:
the reel toggle is configured send a first toggle signal to the controller, wherein the first toggle signal causes the controller to send the retraction signal; and
the reel toggle is configured to send a second toggle signal to the controller, wherein the second toggle signal causes the controller to send the extension signal.

10. The system of claim 9, further comprising:
a locking mechanism, wherein the locking mechanism has an engaged state a disengaged state, wherein, when the locking mechanism is in the engaged state, the reel cannot rotate in at least a direction of the forward direction and the reverse direction; and
a reel locking toggle, the reel locking toggle configured to send a reel locking toggle signal to the controller, wherein receiving the reel locking toggle signal causes the controller to send an unlocking signal to the locking mechanism, wherein the unlocking signal causes the locking mechanism to enter its disengaged state.

11. The system of claim 10, further comprising a charging connector, wherein:
the charging connector is disposed at one end of the charging cable;
the charging connector is electrically connected to the charging cable;
the charging connector configured to couple with a corresponding charging port on an electric aircraft; and
the reel locking toggle is disposed on the surface of the charging connector.

12. The system of claim 1, further comprising a reel toggle, the reel toggle configured send a first toggle signal to the controller, wherein the first toggle signal causes the controller to send the retraction signal.

13. The system of claim 12, wherein the reel toggle is a button, wherein pressing the button causes the reel toggle to send the first toggle signal.

14. The system of claim 12, further comprising a charging connector, wherein:
the charging connector is disposed at one end of the charging cable;
the charging connector is electrically connected to the charging cable;
the charging connector configured to couple with a corresponding charging port on an electric aircraft; and
the reel toggle is disposed on the surface of the charging connector.

15. The system of claim 12, wherein the reel toggle is disposed on the outer case of the cable reel module.

16. The system of claim 1, further comprising a helipad, wherein:
the cable reel module is disposed on the helipad; and
the helipad comprises a landing surface, wherein:
the landing surface is a substantially horizontal, planar surface; and
the landing surface is large enough to accommodate an electric aircraft.

17. The system of claim 16, wherein the cable reel module is disposed at an elevation less than that of the landing surface.

18. The system of claim 1, further comprising a moveable platform, wherein the charging cable, the energy source, the cable reel module, and the controller are located on top of the moveable platform.

19. The system of claim 18, wherein the moveable platform is motorized.

20. The system of claim 18, wherein the moveable platform is remotely controlled.

* * * * *